United States Patent Office 3,196,000
Patented July 20, 1965

3,196,000
PROCESS FOR THE DIRECT REDUCTION OF IRON ORES IN ROTATING CYLINDRICAL FURNACES
Kurt Meyer, Frankfurt am Main, Hans Rausch, Oberursel, Taunus, Günter Heitmann, Frankfurt am Main, and Wolfgang Janke, Oberursel, Taunus, Germany, assignors to Metallgesellschaft Aktiengesellschaft, Frankfurt am Main, Germany
No Drawing. Filed Dec. 6, 1962, Ser. No. 242,622
Claims priority, application Germany, Dec. 8, 1961, M 51,122
2 Claims. (Cl. 75—5)

This invention relates to the direct reduction of hard burned iron ore pellets in a rotating cylindrical furnace.

The reducing of a spongy iron-like product in a rotating cylindrical furnace is known. A mixture is used of pellets made from oxidic iron ores and solid carbon-containing reducing agents which are not bound into the pellets but are loosely admixed therewith, and the reduction is carried out in such a way that the carbon monoxide formed from the carbon content of the charge performs the direct work of reduction and the carbon dioxide formed in the course of the reduction is regenerated continuously with additional solid carbon into carbon monoxide according to the known Boudouard reaction. Unpublished proposals suggest that provisions be made for the solid carbon-containing agent being mixed with the pellets at an introductory point positioned behind the feed point for the pellets and, if so desired, several such feed points may be so provided. An advantage of this mode of operation lies in that, among other things, it is possible to supply at least a portion of the requirement for solid carbon-containing reducing agents in the form of gas rich coals having a high content of volatiles and known as fat coals, and which are carbonized at a low temperature into de-gassed fuel in the final zone of the furnace, said fuel being recycled to a point of the furnace which is nearer the feed end of the furnace. The gases evolved in the course of the low temperature carbonization are preferably used to supply the heat required for the preheating of the pellets. Admittedly, a limit is placed on the use of fat coals even with this process inasmuch as only a certain quantity of volatile low temperature carbonizing products can be profitably used as corresponds to the heat required for preheating. With fat coals, therefore, a portion of the requirement for solid carbon must be provided by high grade fuels with low gas content, such as coke or anthracite.

Another unpublished suggestion proposes the pre-hard burning of the iron ore pellets fed to the rotating cylindrical furnace according to conventional practice or on a sinter band. The advantage of this suggested process is that it permits a higher throughput in the rotary furnace and excludes to a very great extent the risk of the caking together of the charge in the furnace. Certainly the total heat requirement for this suggested process is somewhat higher than when feeding the rotary furnace with unburned green pellets, as when burning the green pellets in the preheating zone of the furnace, the sensible heat of the hard burned pellets fully benefits the reduction zone, which is not possible to the same extent by the preliminary burning of the pellets in a special furnace.

Certainly it is possible to again utilize the sensible heat of the hard burned pellets to a certain extent, as, for example, by cooling them down by means of cooling air and then using the heat of the hot air thus obtained as combustion air for the furnace, but nevertheless even with this utilization of the waste heat, it is impossible to avoid appreciable heat losses.

The object of this invention is to produce an improved process which eliminates the above-described disadvantages of known and heretofore unpublished suggested processes, while retaining all of their advantages. More particularly, in accordance with this invention, the rotating cylindrical furnace is fed solely with pellets hard burned on a sinter machine and, for the purpose of reduction, the sensible heat content of the hard burned pellets is used to a far greater extent than was heretofore possible.

It is apparent that it is not possible to directly feed the rotating cylindrical furnace with hot pellets hard burned on the sinter machine without intermediate cooling, because the pellets are hard burned at a temperature of 1200° C. and above, and at such a temperature it is not possible to separate the pellets from the grate protecting layer of inert material or from the side wall protecting layers of the sinter machine, nor to convey them from the sinter machine to the rotary furnace in a technically useful manner. In addition, without cooling, the grate carriages, and more particularly the grate bars of the sinter machine, would be rapidly overheated to a non-acceptable degree.

However, according to this invention, it has been found that, with a relatively low partial cooling of the finished burned pellets, preferably to a temperature of 600° C., the recited disadvantages either do not at all occur, or those that do can be overcome. Thus, for example, with apparatus available today, it is possible to separate the hot hard burned pellets from the protective grate layer and side wall layers at a temperature of approximately 600° C. Also, conveyor devices, such as plate conveyors, are available for enabling the partially cooled pellets to be conveyed at this temperature from the sintering machine to the rotary furnace. The overheating of the grate carriages and the grate bars can be held within tolerable limits because of the choice of the partial cooling temperature of about 600° C. and the fact that, during the return of the grate carriages, cooling by convection takes place. In a preferred embodiment of this invention, this cooling is aided by the fact that a cooling device is positioned on the return reach of the sinter machine, which device further cools the grate carriages and grate bars by a blast of cooling air. The heat content of the heated cooling air resulting is used, if required, once again in a conventional way, as combustion air either for the sinter machine or for the burners of the subsequent rotary cylindrical furnace. It is to advantage that the hot grate lining and side wall protection layers, after the separation and removal of the hot pellets, can also be cooled by conventional means and the heated cooling air here obtained likewise being available for combustion air use.

The process of this invention not only improves the heat economy, but also provides an increase in the output of the rotating cylindrical furnace, as now an appreciably shorter portion of the furnace is needed for the heating of the hard burned pellets to reduction temperature for the purpose of obtaining the reduction. Whereas, when cold pellets are fed to the furnace, one-third of the furnace length is needed for the preheating of the pellets to reduction temperature, according to this invention, only one-fifth of the furnace length or less is required for this purpose.

Another advantage of the process of this invention lies in that now there is no longer any limit set on the use of fat coals as the solid reducing agent in the rotary furnace. An excess of volatile fuels which may possibly appear in the furnace can be used profitably for first hard burning green pellets. Advantageously, this is brought about because the hot waste gases of the rotary cylindrical furnace, possibly following an after-combustion of the still unburned volatile fuels contained therein, give up their heat content in a heat exchanger to the combustion air used in the furnace for burning the pellets. However, it is also possible to use the hot waste gases of the rotary cylindrical furnace, which may possibly have been after-burned, directly, that is without transferring the heat to some other gaseous medium, in a known manner, for drying and preheating the green pellets on the sinter band.

In the following examples, the process of this invention is compared with the prior art:

EXAMPLE 1 (PRIOR ART)

The iron ore used for making the pellets was a magnetite of which 70% had a particle size below 60 microns. The pellets were formed on a pelletizing plate having a diameter of 1 meter and by adding 10% water with regard to the material being pelletized. The green pellets so formed had a diameter of from 10 to 15 mm. and were heat hardened on a sinter band having a suction surface of 1.5 m.$^2$, and at a temperature of 1280° C. The protective grate layer for the sinter band was composed of a 10 cm. thick layer of pre-burnt broken pellets, and the side wall protecting layers were composed of pre-burnt broken pellets having a particle size of 4 to 8 mm. formed into a 6 cm. thick layer. The daily output of the sinter band, including cooling the pellets to 100° C., amounted to 20 tons of pellets per each square meter of sinter band surface. The energy consumed for pelletizing and heat hardening of the pellets was 400 calories per each kilogram of pellets.

These heat hardened pellets having diameters of from 10 to 15 mm. were fed at the rate of 30 tons per day into a cylindrical rotary furnace 20 m. long and having a diameter of 1.5 m. The furnace was provided with six wall burners and one central burner.

The chemical composition of the raw pellets was 67% iron, 0.01% sulphur, and about 4% gangue.

13.5 tons of anthracite coal having a 5% water content was fed per day into the rotary furnace for providing the reducing material. This coal had the following composition:

80% $C_{fix}$ ⎫
12.2% ashes ⎬ In regard to the dry weight
7% volatile components ⎭

For neutralizing the sulphur, 1.35 metric tons of dolomite having a grain size of 1 to 3 mm. were fed per day into the rotary furnace.

The first 8 meters of the rotary furnace served as the pellet preheating zone and raised the temperature of the charged pellets from 20 to 1100° C., while the last 12 meters of the furnace length operated solely as the reduction zone at a temperature of about 1100° C. 4630 Nm.$^3$ of town gas per day were fed into the furnace by way of the central and wall burners with the lowest value of heat being 3900K cal. per Nm.$^3$. The quantity of waste gas amounted to 75,000 Nm.$^3$ per day, and the temperature of the waste gas at the discharge end of the furnace was approximately 600° C. The unburned component content of the waste gas was less than 1%.

The output of the furnace was 21.5 tons of reduced pellets, 5.5 tons of excess carbon material in the form of coal, as well as the burned dolomite, and an amount of coal ashes. About 25% of the pellets produced had a particle size less than 10 mm. and had the following chemical composition:

| | Percent |
|---|---|
| Total-iron | 93.3 |
| Metallic iron | 89.8 |
| Sulphur | 0.01 |
| Carbon | 0.07 |

EXAMPLE 2 (THE PROCESS OF THIS INVENTION)

The raw green pellets were made in the same way as described in Example 1. These pellets were heat hardened on the same sinter band as in Example 1 which had the same grate and wall protective layers.

The pellets were heat hardened at a temperature of about 1280° C. and then cooled to only 600° C. on the sinter band as contrasted to Example 1. Thus the capacity of the sinter band was increased about 20% by giving a daily output of 36 tons of pellets per day which corresponded to a capacity of 24 tons of pellets per square meter of sinter band surface. The hot pellets removed from the sinter band were sifted on a hot sieve to separate the broken pellets serving as the grate and wall protective layers, and the hot pellets having a grain size of from 10 to 15 mm. and a temperature of about 600° C. were fed into the rotary furnace of Example 1 at a rate of 36 tons of pellets per day.

The reducing material was composed of 16.2 metric tons of anthracite coal having a 5% water content fed per day into the furnace. This anthracite had the same chemical composition as in Example 1.

For neutralizing the sulphur, 1.6 metric tons of dolomite having a grain size of 1 to 3 mm. were fed per day into the furnace.

The first 4 meters of the rotary furnace length served as the pellet preheating zone and raised the temperature of the charged pellets from 600 to 1100° C., while the remaining 16 meters of the furnace length operated as the reduction zone at a temperature of about 1100° C. The central and wall burners were fed 4600 Nm.$^3$ of town gas per day for heating the furnace, with the lowest heat value being 3900K cal. per Nm.$^3$. The volume of waste gas was 86,000 nm.$^3$ per day while the temperature of the waste gas at the discharge end of the furnace was about 900° C. The unburned components in the waste gas were less than 1%.

The daily output of the furnace was 26 metric tons of reduced pellets, 6.6 metric tons of excess carbon in the form of coal, as well as the burned dolomite, and some portion of coal ashes. The portion of the iron sponge-like product that was produced having a grain size less than 10 mm. was 7%, and the chemical composition corresponded to that of Example 1.

Of the daily 86,000 Nm.$^3$ waste gas, 36,000 Nm.$^3$ per day was used directly for the drying of the green pellets on the sinter band. A further 36,000 Nm.$^3$ per day was led to heat exchangers to preheat the combustion air required for the heat hardening of the pellets. The remaining 14,000 Nm.$^3$ per day was introduced directly into the burner hoods of the sinter band. In this process, the consumption of energy for pelletizing and heat hardening the pellets was lowered to 220K cal. per ton.

EXAMPLE 3

The green pellets were made and hardened as in Example 1 using the same grate and side wall protection layers as in Example 1. The pellets were heat hardened at a temperature of about 1280° C. and then cooled to only 600° C. on the sinter band, in contrast to Example 1, so that the output of the sinter band was 36 metric tons of pellets corresponding to a capacity of 24 tons of pellets per square meter of sinter band surface, an increase of 20% per day over Example 1. The hot pellets removed from the sinter band were separated from the broken protective grate and wall layers on a hot sieve, and the pellets having a grain size of from 10 to 15 mm. and a temperature of about 600° C. were fed at the rate of 36 metric tons per day into the rotary furnace of Example 1.

Reducing material composed of 11 tons of fat coal was introduced and distributed in the furnace by means of the feeding device along the wall of the furnace. The chemical composition of this fat coal was as follows:

40% $C_{fix}$  
36% volatile components  
8% moisture  
Remainder ashes  
} In regard to the dry weight.

The heat value of the coal was 6200K cal. per kg. Also, 5 tons of coke per day having a heat value of 6800K cal. per kg. together with 36 tons of pellets per day and 1.6 tons of dolomite per day having a grain size of from 1 to 3 mm. for neutralizing the sulphur were introduced centrally into the furnace. The first 4 meters of the furnace length served as the pellet preheating zone and raised the temperature of the pellet charge from 600 to 1100° C., while the remaining 16 meters of furnace length served as the reduction zone at a temperature of about 1100° C. ,The volume of waste gas was 90,000 Nm.³ per day and the temperature of the waste gas at the discharge end of the furnace was about 900° C. The unburned components in the waste gas amounted to about from 4 to 5%.

The waste gases were led to a combustion chamber having a temperature of about 1200° C. and there burned with 22,500 Nm.³ of air per day. This combustion air had been preheated to 900° C. in a heat exchanger by means of a partial flow of 22,500 Nm.³ per day of the furnace waste gas which had been burned in the combustion chamber. The combustion chamber discharged 82,500 Nm.³ of re-burned waste gas per day at a temperature of 1200° C. Of these, 29,000 Nm.³ per day were used for drying the pellets on the sinter band. However, this drying gas was first cooled to 800° C. by mixing it with fresh air. 44,000 Nm.³ per day were directly introduced into the sinter band for the heat hardening of the pellets. The burners in the burner hoods were first throttled and operated with town gas so that an addition of about 50 calories per ton of pellets was added in the form of town gas. However, after the temperature was stabilized, no additional heat was necessary. The remainder of the re-used hot gas could be used for other purposes.

The output of the furnace was 26 tons of reduced pellets a day, 6.6 tons of excess carbon per day in the form of coal, as well as the burned dolomite and a portion of coal ashes.

Having now described the means by which the objects of this invention are obtained, we claim:

1. In the process for the direct reduction of hard-burned iron ore pellets in a rotating cylindrical furnace in which the iron ore is reduced by means of carbon monoxide formed within the furnace from solid carbon-containing agents admixed with said pellets, the improvement comprising the steps of heating green unreduced iron oxide pellets on a sintering grate having a bottom layer and side layers of protective material to a pellet heat hardening temperature of at least 1200° C. and under non-reducing conditions, cooling the hardened pellets to a temperature of about 600° C., removing both the hardened pellets and protective material from said grate, separating the protective material from the hardened pellets, and then introducing the hardened pellets at a temperature of about 600° C. into said furnace.

2. In the process of claim 1, said carbon-containing agents consisting of coals having a high content of volatiles.

References Cited by the Examiner

UNITED STATES PATENTS

| | | | |
|---|---|---|---|
| 889,125 | 5/08 | Hartenstein | 75—36 |
| 2,112,566 | 3/38 | Hasselbach | 75—36 |
| 2,855,290 | 10/58 | Freeman | 75—33 |
| 3,024,101 | 3/62 | Erck | 75—05 |
| 3,029,141 | 4/62 | Sibakin | 75—34 |
| 3,068,091 | 12/62 | Kirkland | 75—36 |
| 3,140,169 | 7/64 | Smith | 75—33 |

DAVID L. RECK, *Primary Examiner.*